United States Patent
Moon et al.

(10) Patent No.: US 11,527,067 B2
(45) Date of Patent: Dec. 13, 2022

(54) ELECTRONIC DEVICE, ACTION INSTANCE GENERATION METHOD, AND RECORDING MEDIUM

(71) Applicant: Electronics and Telecommunications Research Institute, Daejeon (KR)

(72) Inventors: Jin Young Moon, Daejeon (KR); Yong Jin Kwon, Daejeon (KR); Hyung Il Kim, Daejeon (KR); Jong Youl Park, Daejeon (KR); Kang Min Bae, Daejeon (KR); Ki Min Yun, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 75 days.

(21) Appl. No.: 17/088,185

(22) Filed: Nov. 3, 2020

(65) Prior Publication Data

US 2021/0142063 A1    May 13, 2021

(30) Foreign Application Priority Data

Nov. 7, 2019    (KR) .................... 10-2019-0142117

(51) Int. Cl.
*G06V 20/40* (2022.01)
*G06K 9/62* (2022.01)
*G06T 7/20* (2017.01)

(52) U.S. Cl.
CPC ............ *G06V 20/40* (2022.01); *G06K 9/623* (2013.01); *G06T 7/20* (2013.01);
(Continued)

(58) Field of Classification Search
CPC ........ G06V 20/40; G06V 20/44; G06V 20/46; G06V 20/49; G06V 10/469; G06V 40/20;
(Continued)

(56) References Cited

U.S. PATENT DOCUMENTS 9,183,431 B2    11/2015    Kim et al.
9,886,623 B2    2/2018    Kim
(Continued)

FOREIGN PATENT DOCUMENTS

KR    10-1979375    8/2019
KR    10-2008290    8/2019

*Primary Examiner* — Amara Abdi
(74) *Attorney, Agent, or Firm* — Kile Park Reed & Houtteman PLLC

(57) ABSTRACT

An electronic device according to an embodiment disclosed herein may include a memory including at least one instruction and a processor. By executing the at least one instruction, the processor may check feature information corresponding to a video and including at least one of an appearance-related feature value and a motion-related feature value from the video, calculate at least one of a starting score related to a starting point of an action instance, an ending score related to an ending point of an action instance, and a relatedness score between action instances on the basis of the feature information corresponding to the video, the action instances being included in the video, and generate an action proposal included in the video on the basis of the at least one score.

20 Claims, 12 Drawing Sheets

(52) U.S. Cl.
CPC ............. *G06T 2207/10016* (2013.01); *G06T 2207/10024* (2013.01); *G06V 20/44* (2022.01)

(58) Field of Classification Search
CPC . G06K 9/623; G06T 7/20; G06T 2207/10016; G06T 2207/10024
See application file for complete search history.

(56) References Cited

U.S. PATENT DOCUMENTS

| | | | |
|---|---|---|---|
| 2005/0216443 A1* | 9/2005 | Morton | G06F 16/245 |
| 2008/0077583 A1* | 3/2008 | Castro | G06F 16/338 |
| | | | 707/999.005 |
| 2011/0213655 A1* | 9/2011 | Henkin | G06Q 30/00 |
| | | | 707/E17.061 |
| 2011/0293250 A1* | 12/2011 | Deever | H04N 5/275 |
| | | | 386/290 |
| 2013/0096860 A1* | 4/2013 | Yuzawa | G06Q 10/063114 |
| | | | 702/92 |
| 2014/0009682 A1* | 1/2014 | Cheng | G11B 27/28 |
| | | | 348/571 |
| 2018/0349704 A1* | 12/2018 | Mehrseresht | G06V 10/85 |
| 2019/0050996 A1* | 2/2019 | Abdelhak | G06V 10/809 |
| 2019/0080176 A1* | 3/2019 | Lan | G06V 20/46 |
| 2019/0108399 A1 | 4/2019 | Escorcia et al. | |
| 2020/0257763 A1* | 8/2020 | Marvaniya | G06F 40/30 |
| 2020/0302178 A1* | 9/2020 | Gao | G06V 10/764 |

\* cited by examiner

ELECTRONIC DEVICE, ACTION INSTANCE GENERATION METHOD, AND RECORDING MEDIUM

FUNDING STATEMENT

This invention was supported by Institute of Information & Communications Technology Planning & Evaluation (IITP) grant funded by the Korea government (MSIT), project No. B0101-15-0266, Development of High Performance Visual BigData Discovery Platform for Large-Scale Realtime Data Analysis and project No. 2020-0-00004, Development of Provisional Intelligence based on Long-term Visual Memory Network.

CROSS-REFERENCE TO RELATED APPLICATION

This application claims priority to and the benefit of Korean Patent Application No. 10-2019-0142117, filed on Nov. 7, 2019, the disclosure of which is incorporated herein by reference in its entirety.

BACKGROUND

1. Field of the Invention

Various embodiments disclosed herein relate to an action recognition technique.

2. Discussion of Related Art

An action recognition technique can acquire a video related to a hue (RGB) or depth from an image sensor and classify an action of an object included in the video on the basis of features of the video. An action recognition technique can detect a specific action on the basis of a video and may monitor a dangerous situation or detect a specific event on the basis of the action.

Also, a video may include various actions that occur in succession and frames in which no action occurs (background). However, a conventional action recognition apparatus can check the starting section and ending section of an action having occurred in a video, generate a well-trimmed video by cutting only portions where an action occurs on the basis of the checked sections, and classify the action on the basis of the well-trimmed video.

SUMMARY OF THE INVENTION

However, it may be very cumbersome and time-consuming to manually cut a continuous action of a video as a single action unit or detect a part where an action occurs (or exclude a background where no action occurs).

Various embodiments disclosed herein may provide an electronic device, an action instance generation method capable of generating an action instance (or case) on the basis of an occurrence time of the action instance, and a recording medium.

According to an aspect of the present invention, there is provided an electronic device including a memory including at least one instruction and a processor, wherein by executing the at least one instruction, the processor may check feature information corresponding to a video and including at least one of an appearance-related feature value and a motion-related feature value from the video, calculate at least one of a starting score related to a starting point of an action instance, an ending score related to an ending point of an action instance, and a relatedness score between action instances on the basis of the feature information corresponding to the video, the action instances being included in the video, and generate an action proposal included in the video on the basis of the at least one score.

According to another aspect of the present invention, there is provided a method of an electronic device generating an action proposal, the method including checking feature information corresponding to a video and including at least one of an appearance-related feature value and a motion-related feature value from the video, calculating at least one of a starting score related to a starting point of an action instance, an ending score related to an ending point of an action instance, and a relatedness score between action instances on the basis of the feature information corresponding to the video, the action instances being included in the video, and generating an action proposal included in the video on the basis of the at least one score.

According to another aspect of the present invention, there is a computer-readable recording medium storing instructions executable by a processor, wherein when executed, the instructions may cause a processor of an electronic device to perform operations of checking feature information corresponding to a video including at least one of an appearance-related feature value and a motion-related feature value from the video, calculating at least one of a starting score related to a starting point of an action instance, an ending score related to an ending point of an action instance, and a relatedness score between action instances on the basis of the feature information corresponding to the video, the action instances being included in the video, and generating an action proposal included in the video on the basis of the at least one score.

BRIEF DESCRIPTION OF THE DRAWINGS

In describing the drawings, like or similar reference numerals may be used for like or similar elements.

DETAILED DESCRIPTION OF EXEMPLARY EMBODIMENTS

Figure 1:
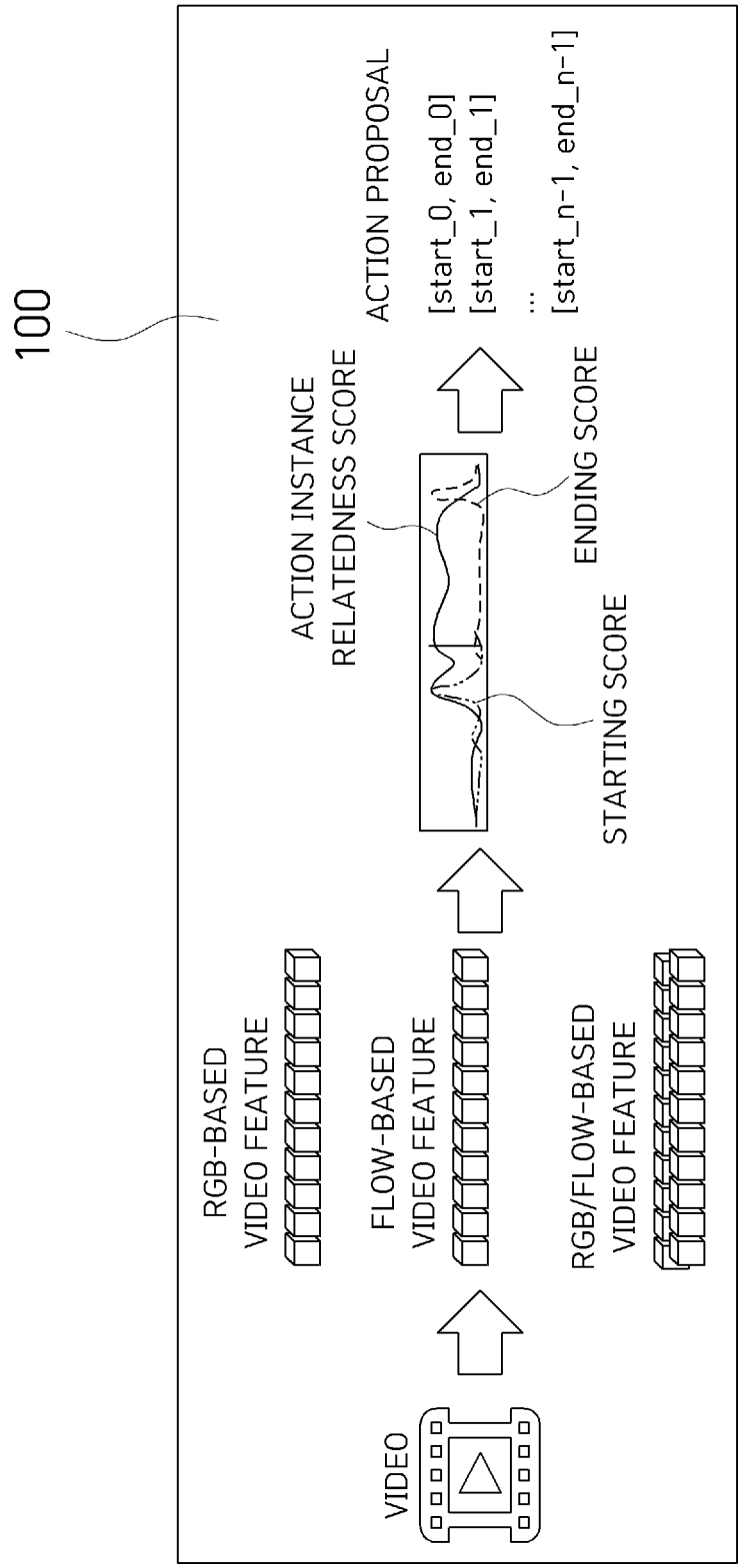
FIG. 1 shows a conceptual diagram of an action proposal generation method according to an embodiment.

FIG. 1 shows a conceptual diagram of an action proposal generation method according to an embodiment.

Referring to FIG. 1, according to an embodiment, an electronic device 100 may split a video into a plurality of snippets. The electronic device 100 may extract static features (RGB-based video features) and dynamic features (flow-based video features) of the video on a snippet basis. The electronic device 100 may calculate at least one of a starting score, an ending score, and a relatedness score of each action instance on the basis of the static features and the dynamic features. The electronic device 100 may generate action proposals corresponding to actions by cutting time sections corresponding to action instances out of a video on the basis of at least one of the scores. The action proposal may be a partial time section of the video cut to include one action instance. In addition, the action proposal may further include pixel location information for one action. However, for convenience of description, an example in which an action proposal is a temporarily divided time section will be described herein.

According to the above embodiment, the electronic device 100 may generate an action proposal excluding a background on the basis of a start time and an end time of an action and relatedness between actions before classifying actions included in a video, and thus it is possible to increase the accuracy of action recognition.

Figure 2:
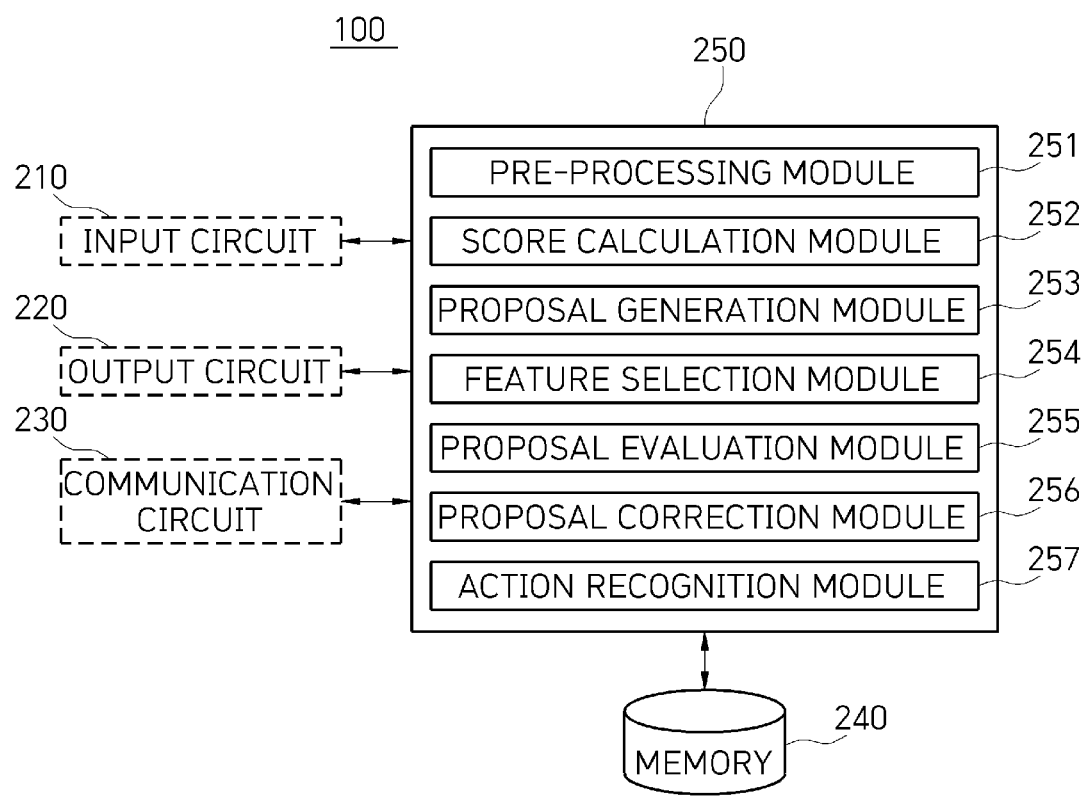
FIG. 2 shows a block diagram of an electronic device according to an embodiment.

FIG. 2 shows a block diagram of an electronic device according to an embodiment.

Referring to FIG. 2, the electronic device 100 according to an embodiment may include a memory 240 and a processor 250. In an embodiment, the electronic device 100 may exclude some elements or further include additional elements. For example, the electronic device 100 may further include an input circuit 210 and an output circuit 220. Also, some of the elements of the electronic device 100 are combined into a single entity, and the functions of the corresponding elements before the combination may be performed in the same manner.

According to an embodiment, the input circuit 210 may detect or receive a user input. The user input may be related to at least one of a score type setting to be used for time section generation and a score type and weight setting and a proposal correction setting to be used for action proposal generation.

According to an embodiment, the output circuit 220 may include a display that displays various types of content (e.g., text, images, videos, icons, and/or symbols).

The memory 240 may store various kinds of data that is used by at least one element (e.g., the processor 250) of the electronic device 100. The data may include, for example, input data or output data for software and relevant commands. For example, the memory 240 may store at least one instruction for action proposal generation. The memory 240 may include a volatile memory and/or a nonvolatile memory.

By executing at least one instruction, the processor 250 may control at least one other element (e.g., a hardware or software element) of the electronic device 100 and may perform various data processing or operations. For example, the processor 250 may include at least one of a central processing unit (CPU), a graphics processing unit (GPU), a microprocessor, an application processor, an application-specific integrated circuit (ASIC), and a field-programmable gate array (FPGA) and may have a plurality of cores. According to an embodiment, the processor 250 may include a pre-processing module 251, a score calculation module 252, a proposal generation module 253, a feature selection module 254, a proposal evaluation module 255, and a proposal correction module 256. Each of the elements of the processor 250 may be a separate hardware module or a software module implemented by at least one processor. For example, functions performed by the pre-processing module 251, the score calculation module 252, the proposal generation module 253, the feature selection module 254, the proposal evaluation module 255, and the proposal correction module 256 may be performed by one processor or may be performed by separate processors.

According to an embodiment, the pre-processing module 251 may generate a plurality of snippets using a plurality of frames included in a video and may generate snippet-based feature information corresponding to the entire video. For example, the pre-processing module 251 may sample at least some frames among a plurality of frames constituting a video in units of a specified frame (e.g., a natural number of 1 or more) and may generate a frame of a specified type on the basis of the sampled frames. The frame of the specified type may include a frame of at least one type selected from an RGB frame and a FLOW frame. The pre-processing module 251 may generate an RGB frame by resizing the sampled frames to a specified resolution. For example, the pre-processing module 251 may generate a FLOW frame capable of checking optical flow on the basis of differences between the sampled frames. The pre-processing module 251 may group k (a specified natural number of) frames of a specified type into one snippet. The pre-processing module 251 may generate snippet-based feature information of the entire video on the basis of specified frames included in each snippet. The feature information may include at least one of an appearance-related feature value, a motion-related feature value, and/or an appearance/motion-related feature value. The appearance-related feature value is feature information related to the shape of each instance included in RGB frames and may include at least one static feature value among polygon, edge, depth, sharpness, saturation, brightness, and depth. The motion-related feature value is feature information related to motion of each instance included in flow frames and may include, for example, dynamic feature values such as optical flow. The appearance/motion-related feature value may include an appearance-related feature value and a motion-related feature value that are related to each other.

According to an embodiment, the score calculation module 252 may acquire snippet-based feature information corresponding to the entire video and calculate at least one of a starting score, an ending score, and a relatedness score of an action instance included in the video on the basis of a score calculation model. For example, the score calculation module 252 may set a relatedness score, which is of a location of one of a snippet, a preceding snippet, and a following snippet in which a probability of including an action instance is greater than or equal to a first threshold probability, to be relatively high on the basis of the feature information corresponding to the video. As another example, the score calculation module 252 may set a starting score, which is of a location of one of a snippet and a preceding snippet in which a probability of being a starting point of an action instance is greater than or equal to a second threshold probability, to be relatively high on the basis of the feature information corresponding to the video. As still another example, the score calculation module 252 may set an ending score, which is of a location of one of a snippet and a following snippet in which a probability of being an ending point of an action instance is greater than or equal to a third threshold probability, to be relatively high on the basis of the feature information corresponding to the video. In this regard, the score calculation module 252 may perform supervised learning on foreground snippets including an action instance and background snippets including no action instance to generate a score calculation module capable of calculating a starting score, an ending score, and a relatedness score.

According to an embodiment, the proposal generation module 253 may generate action proposals corresponding to all action instances included in the video by setting a period from a start time of each action instance to an end time thereof as one time section on the basis of at least one of a starting score, an ending score, and a relatedness score for each snippet. The action proposal may be a partial time section of the video cut to include one action instance. For example, the proposal generation module 253 may generate a time section of a specified type corresponding to at least one of a first time section generated by combining snippets in which a sum of the starting score and the ending score is maximized in the entire video, a second time section generated by combining snippets in which the relatedness score between the action instances is greater than or equal to a threshold value, or a third time section generated by weighted-summing the first time section and the second time section. As another example, the proposal generation module 253 may generate action proposals corresponding to all action instances included in the entire video by cutting one proposal corresponding to each generated time interval out of the entire video.

According to an embodiment, the feature selection module 254 may select section feature information corresponding to a time section of each action proposal among the snippet-based feature information of the entire video and associate the selected section feature information to each action proposal. According to various embodiments, the proposal generation module 253 expands each action proposal to include a preceding or following time section, select section feature information corresponding to the expanded action proposals, and associate the section feature information with the expanded action proposals.

According to an embodiment, the proposal evaluation module 255 may acquire section feature information corresponding to the action proposals, input the action proposals and the acquired section feature information to an evaluation model, and determine a proposal correction offset and a proposal score of each action proposal on the basis of the evaluation model. For example, the proposal evaluation module 255 may determine a time section including an action instance included in each action proposal on the basis of the section feature information and may determine a higher proposal score when the determined time section is more similar to section information of each action proposal. The proposal evaluation module 255 may select an action proposal with a proposal score being greater than or equal to a threshold score and may determine a proposal correction offset so that a difference between a time section checked for the selected action proposal and section information of the selected action proposal can be reduced. The proposal correction offset may be, for example, a value for correcting at least one of a starting point and an ending point of the action proposal. For example, when the total time section of an action proposal is to be increased by one second by delaying the ending point of the action proposal by one second, the proposal correction offset may be +1.1. The proposal score, which is a decimal between 0 and 1, may be a score corresponding to the reliability of the action proposal. In this regard, the proposal evaluation module 255 may generate an evaluation model for calculating the proposal correction offset and the proposal score by performing supervised learning on the action instance and the section feature information related to the action instance.

According to an embodiment, the proposal correction module 256 may temporarily correct an action proposal on the basis of a proposal correction offset. For example, the proposal correction module 256 may adjust at least one of the total time section, a starting point, or an ending point of an action proposal with a proposal score being greater than or equal to a threshold score so that the action proposal corresponds to a proposal correction offset. As another example, when the proposal correction offset is +1.1, the proposal correction module 256 may increase the total time section of the action proposal by one second by delaying the end time of the action proposal by one second.

According to an embodiment, the processor 250 may provide a user interface (UI) screen 1000 related to variable settings for action proposal generation through the input circuit 210 and may acquire, through the input circuit 210, a user input related to variable settings for at least one of a score type to be calculated to generate a time section set by a user (1010), a type and weight of a time section to be used for proposal generation (1020), and the use or non-use of proposal correction (1030). When the user input is acquired, the processor 250 may check setting of at least one variable and generate an action proposal corresponding to the set variable. For example, the proposal generation module 253 may generate a time section corresponding to the score type 1010 checked from the user input in the entire video. As another example, the proposal generation module 253 may generate an action proposal corresponding to the type and weight of the time section to be used for proposal generation (hereinafter referred to as a type and weight of the time section 1020) checked from the user input using the entire video. As still another example, when it is determined from the user input that a proposal correction function is set to be usable, the proposal evaluation module 255 may generate a proposal correction offset, and the proposal correction module 256 may correct a pre-generated action proposal on the basis of the proposal correction offset.

According to various embodiments, the processor 250 may further include an action recognition module 257 configured to classify a class to which an action belongs on the basis of an action proposal. In this case, the action recognition module 257 may input an action proposal with a proposal score which is greater than or equal to a threshold score or an action proposal corrected by the proposal correction module 256, classify a class to which an action instance included in the input action proposal belongs, and output the classified class.

According to various embodiments, the electronic device 100 may further include a communication circuit 230 and may generate an action proposal in response to a user input of an external electronic device through the communication circuit 230. For example, the electronic device 100 may be a web server configured to acquire a video from an external electronic device through the communication circuit 230, generate an action proposal corresponding to the video, and provide the generated action proposal to the external electronic device.

According to the above embodiment, the electronic device 100 may generate an action proposal excluding a background on the basis of a start time and an end time of an action and relatedness between actions before classifying actions included in a video, and thus it is possible to increase the accuracy of action recognition.

Figure 3:
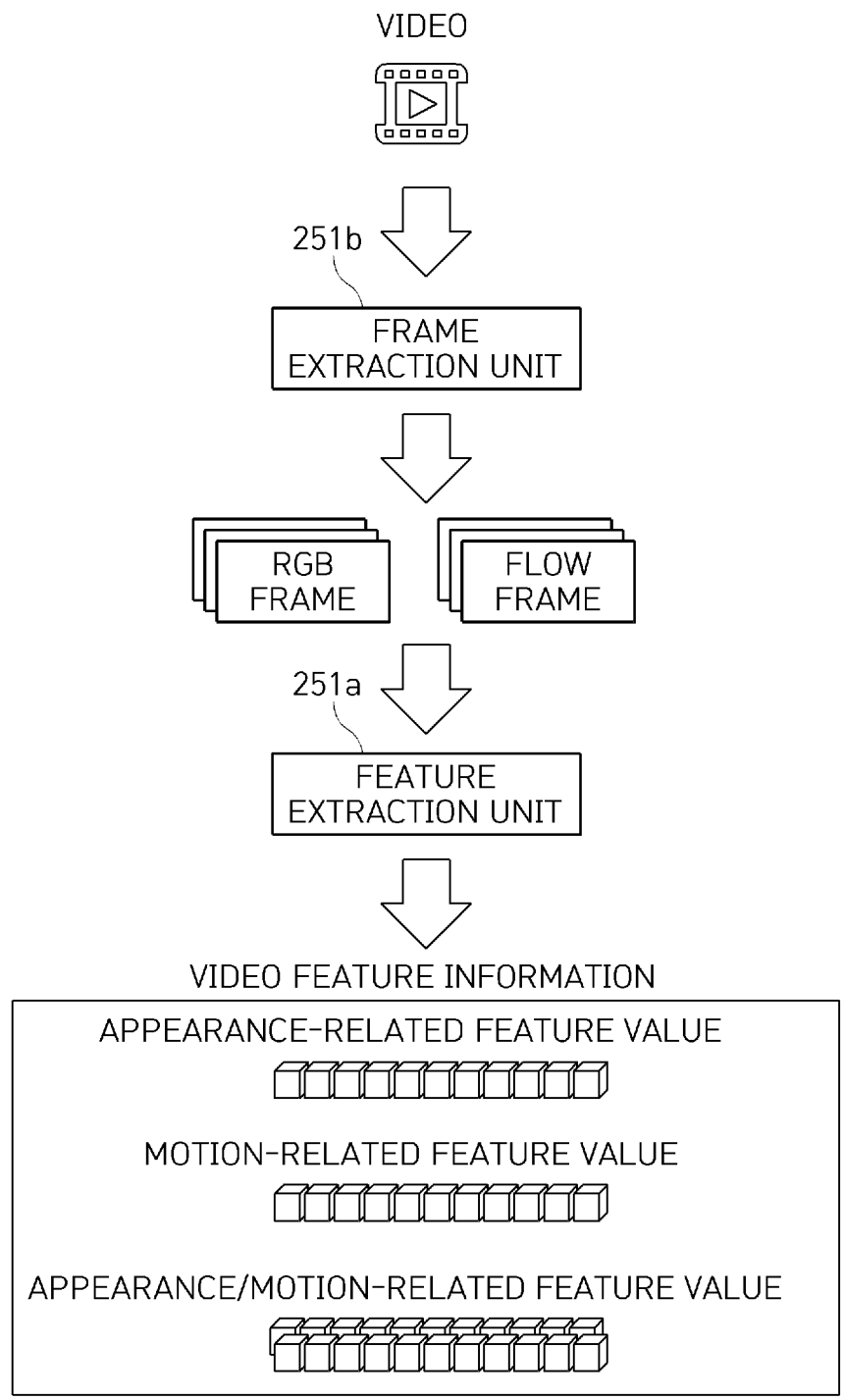
FIG. 3 shows a configuration of a pre-processing module according to an embodiment.

FIG. 3 shows a configuration of a pre-processing module according to an embodiment.

Referring to FIG. 3, according to an embodiment, the pre-processing module 251 may include a frame extraction unit 251a and a feature extraction unit 251b.

According to an embodiment, the frame extraction unit 251a may perform sampling from a video a predetermined number of times and may generate a frame of at least one type selected between an RGB frame and a FLOW frame using sampled frames. For example, the frame extraction unit 251a may generate an RGB frame by converting the sampled frames to a specified resolution. As another example, the frame extraction unit 251a may generate a FLOW frame by performing image processing such that a background area is removed from each of the sampled frames and a foreground part remains in the corresponding sampled frame. For convenience of description, an example in which the frame extraction unit 251a generates an RGB frame and a FLOW frame paired with each other on the basis of the sampled frames will be described herein.

According to an embodiment, the feature extraction unit 251b may set k (a specified natural number) frames (or k pairs of RGB frames and FLOW frames) as one snippet and may generate snippet-based feature information corresponding to the entire video on the basis of the RGB frames and the FLOW frames and on a snippet basis. For example, when the number of frames sampled from the entire video is N, the feature extraction unit 251b may generate N/k snippets and feature information. The feature information may include at least one of an appearance-related feature value, a motion-related feature value, and/or an appearance/motion-related feature value. The appearance-related feature value is feature information related to the shape of each instance included in RGB frames and may include at least one static feature value among polygon, edge, depth, sharpness, saturation, brightness, and depth. The motion-related feature value is feature information related to motion of each instance included in flow frames and may include, for example, dynamic feature values such as optical flow. The appearance/motion-related feature value may include an appearance-related feature value and a motion-related feature value that are related to each other.

Figure 4:
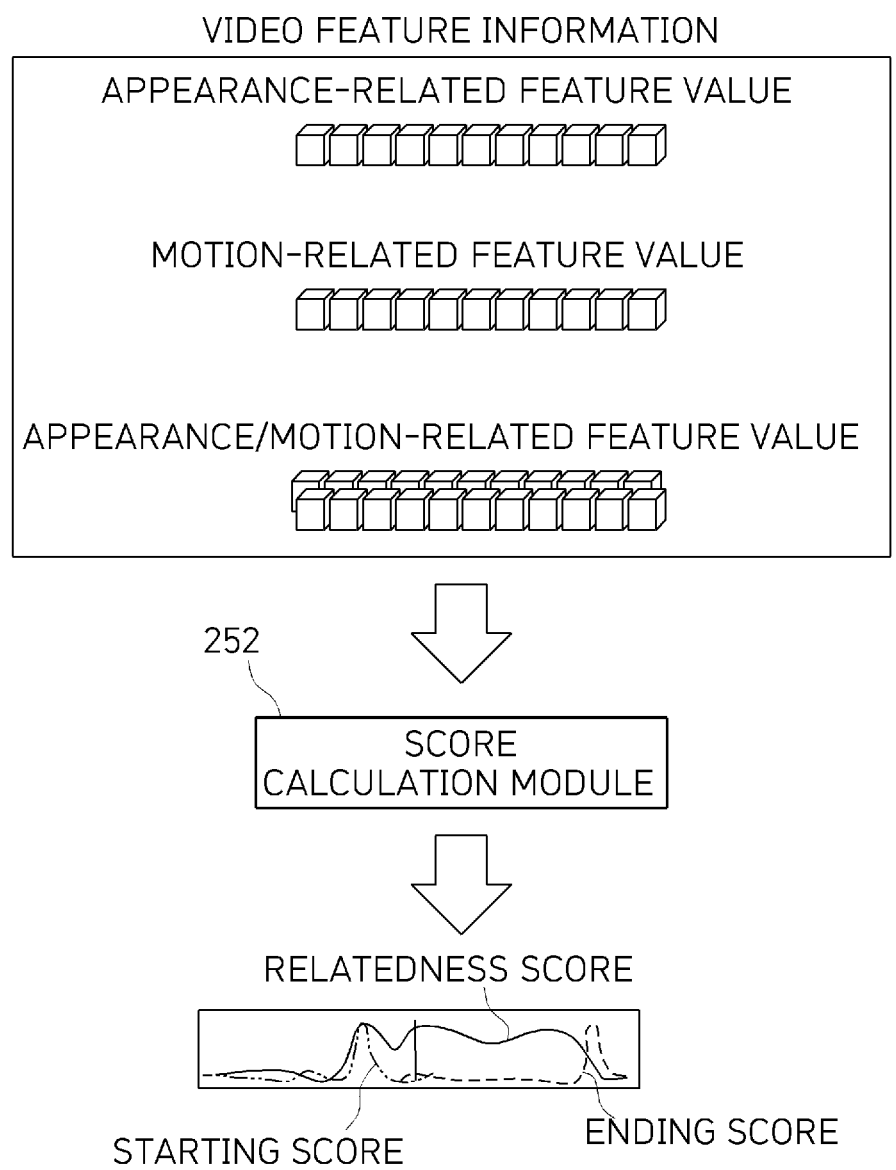
FIG. 4 shows a configuration of a score calculation module according to an embodiment.

FIG. 4 shows a configuration of a score calculation module according to an embodiment.

Referring to FIG. 4, according to an embodiment, the score calculation module 252 may acquire snippet-based feature information corresponding to the entire video and input the acquired feature information to a feature of a score calculation module to calculate starting scores (e.g., a starting score map), ending scores (e.g., an ending score map), and a relatedness score (e.g., a relatedness score map) for action instances included in the video. For example, the score calculation module 252 may set each snippet as a reference snippet in sequence and may check a probability that the reference snippet and neighboring snippets preceding and following the reference snippet include an action instance on the basis of feature information corresponding to the snippet sequence. The score calculation module 252 may generate a relatedness score map by determining relatedness scores of locations of a reference snippet and neighboring snippets in which a probability of including an action instance is greater than or equal to the first threshold probability to be 1 and determining relatedness scores of locations of snippets including no action instance to be 0. The score calculation module 252 may generate a starting score map by, among the snippets in which a probability of including an action instance is greater than or equal to the first threshold probability, determining a starting score of a location of a snippet in which a probability of being a starting point is greater than or equal to the second threshold probability to be 1, and determining a starting point of a location of a snippet in which a probability of being a starting point is less than the second threshold probability to be 0. The score calculation module 252 may generate an ending score map by, among the snippets in which a probability of including an action instance is greater than or equal to the first threshold probability, determining an ending score of a location of a snippet in which a probability of being an ending point is greater than or equal to the third threshold probability to be 1 and determining an ending score of a location of a snippet in which a probability of being an ending point is less than the third threshold probability to be 0.

Figure 5A:
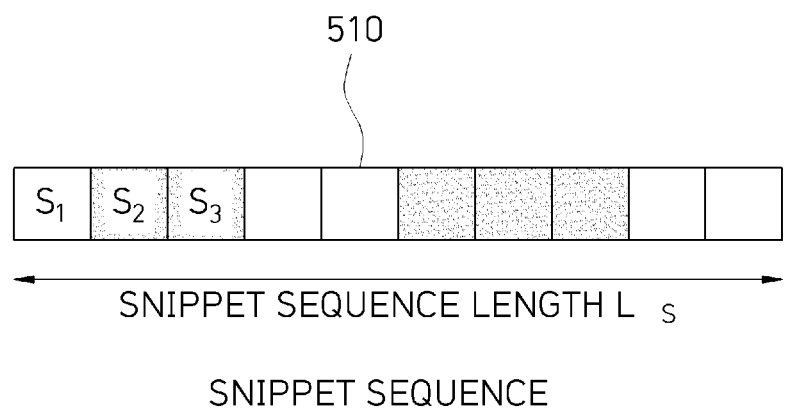
FIG. 5A shows a snippet sequence used for score calculation training according to an embodiment.
Figure 5B:
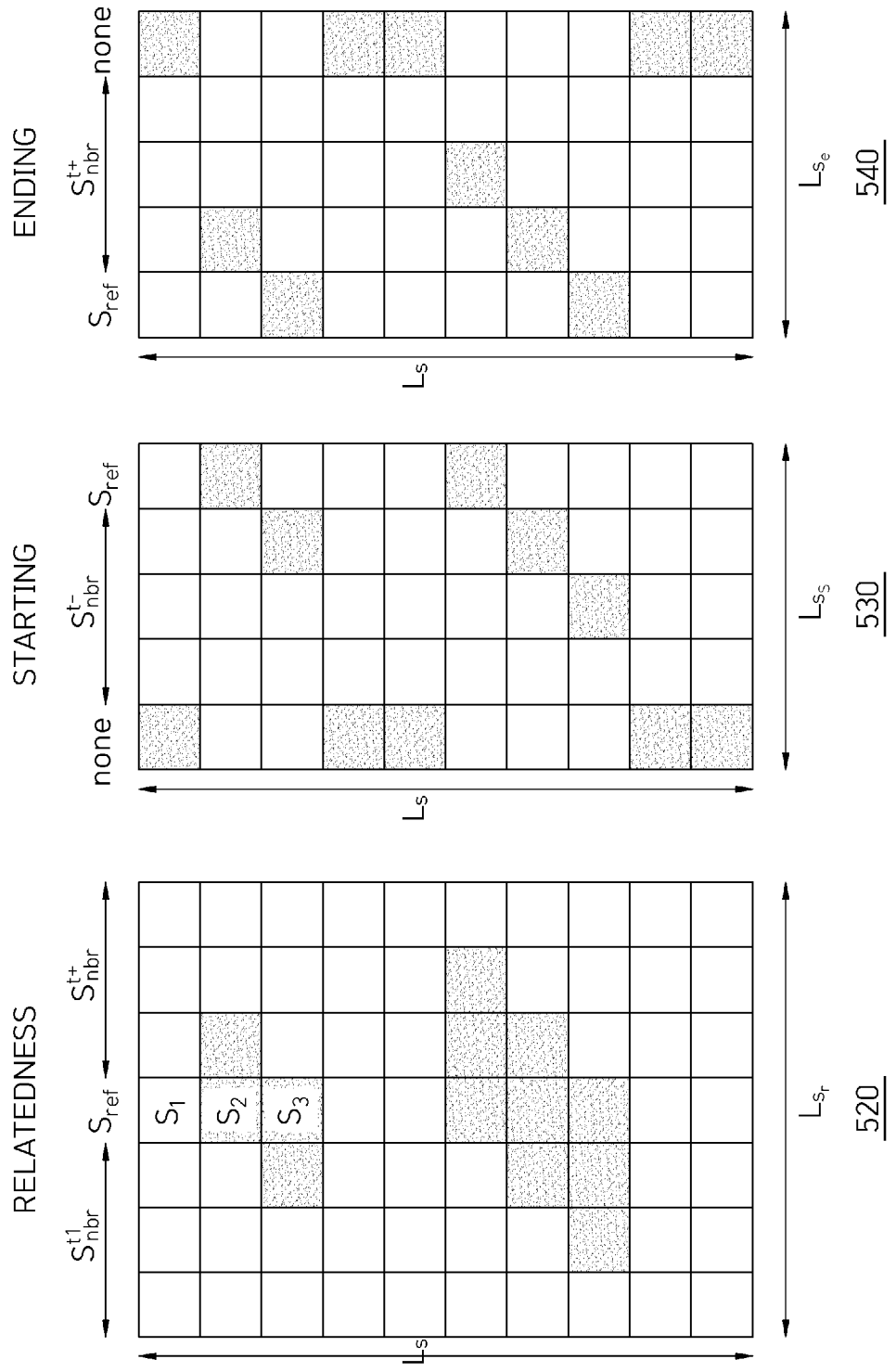
FIG. 5B shows a score map related to a snippet sequence according to an embodiment.

FIG. 5A shows a snippet sequence used for score calculation training according to an embodiment, and FIG. 5B shows a score map related to a snippet sequence according to an embodiment.

Referring to FIG. 5A, a training video may be divided into a total of ten snippets S1, S2, S3, S4, S5, S6, S7, S8, S9, and S10, and a snippet sequence 510 corresponding to the training video may include a total of ten snippets S1, S2, S3, S4, S5, S6, S7, S8, S9, and S10. Among the total of ten snippets of FIG. 5A, S2 and S3 may be snippets including a first action instance, and S6, S7, and S8 may be snippets including a second action instance.

Referring to FIGS. 5A and 5B, according to an embodiment, the score calculation module 252 may set each snippet as a reference snippet in sequence and may generate a relatedness score map 520, a starting score map 530, and an ending score map 540 on the basis of feature information of each snippet and a temporal relationship between the reference snippet and snippets adjacent to the reference snippet. For example, the score calculation module 252 may check whether a reference snippet $S_{ref}$, a first specified number of (e.g., three) neighboring snippets $s^{t-}_{nbr}$ preceding the reference snippet $S_{ref}$ (hereinafter referred to as left snippets), and a first specified number of neighboring snippets $s^{t+}_{nbr}$ following the reference snippet $S_{ref}$ (hereinafter referred to as right snippets) include an action instance, determine relatedness scores of locations of the snippets $S_2$, $S_3$, $S_6$, $S_7$, and $S_8$, in which the snippet $S_{ref}$ and the neighboring snippets $s^{t-}_{nbr}$ and $s^{t+}_{nbr}$ include an action instance, to be 1, and determine relatedness scores of locations of the snippets $S_1$, $S_4$, $S_5$, $S_9$, and $S_{10}$, in which the snippet $S_{ref}$ and the neighboring snippets $s^{t-}_{nbr}$ and $s^{t+}_{nbr}$ include no action instance, to be 0, thereby generating the relatedness score map 520. Referring to the first row of the relatedness score map 520, the score calculation module 252 may determine relatedness scores of the first snippet $S_1$, which includes no action instance, and a neighboring snippet (the second snippet $S_2$) to be 0. Referring to the second row of the relatedness score map 520, the score calculation module 252 may set relatedness scores of the second snippet $S_2$ and a neighboring snippet (the third snippet $S_3$), which include the same action instance, to be 1 and may set a relatedness score of the left snippet (the first snippet $S_1$), which includes no action instance, to be 0. Referring to the third row of the relatedness score map 520, the score calculation module 252 may set relatedness scores of the third snippet $S_3$ and the left snippet (the second snippet $S_2$), which include the same action instance, to be 1 and may set a relatedness score of the right snippet (the fourth snippet $S_4$), which includes no action instance, to be 0. In this way, the score calculation module 252 may generate the relatedness score map 520 including the relatedness scores of all the snippets included in the snippet sequence 510. As another example, the score calculation module 252 may check whether a reference snippet $S_{ref}$ and a second specified number of (e.g., four) neighboring snippets $s^{t-}_{nbr}$ preceding the reference snippet $S_{ref}$ (hereinafter referred to as left snippets) include an action instance, determine starting scores of locations of the snippets $S_2$, $S_3$, $S_6$, $S_7$, and $S_8$, in which the snippet $S_{ref}$ and the neighboring snippets $s^{t-}_{nbr}$ include an action instance, to be 1, and determine starting scores of locations of the snippets $S_1$, $S_4$, $S_5$, $S_9$, and $S_{10}$, in which the snippet $S_{ref}$ and the neighboring snippets $s^{t-}_{nbr}$ include no action instance, to be 0, thereby generating the starting score map 530. Referring to the first row of the starting score map 530, when the first snippet $S_1$ is set as a reference snippet, the score calculation module 252 may determine a starting score of the first snippet $S_1$, which includes no action instance, to be 0 (none). Referring to the second row of the starting score map 530, when setting the second snippet $S_2$ as a reference snippet, the score calculation module 252 may set a starting score of the second snippet $S_2$, which corresponds to the starting point of the first action instance, to be 1. Referring to the third row of the starting score map 530, when the third snippet $S_3$ is set as a reference snippet, the score calculation module 252 may set a starting score of a location of a snippet adjacent to the left of the third snippet $S_3$ (the second snippet $S_2$), which corresponds to the starting point of the first action instance, to be 1. In this way, the score calculation module 252 may generate the starting score map 530 including the starting scores of all the snippets included in the snippet sequence 510. As still another example, the score calculation module 252 may check whether a reference snippet $S_{ref}$ and a third specified number of (e.g., four) neighboring snippets $s^{t}_{nbr}$ following the reference snippet $S_{ref}$ (hereinafter referred to as right snippets) include an action instance, determine ending scores of locations of the snippets $S_2$, $S_3$, $S_6$, $S_7$, and $S_8$, in which the snippet $S_{ref}$ and the neighboring snippets $s^{t+}_{nbr}$ include an action instance, to be 1, and determine ending scores of locations of the snippets $S_1$, $S_4$, $S_5$, $S_9$, and $S_{10}$, in which the snippet $S_{ref}$ and the neighboring snippets $s^{t-}_{nbr}$ include no action instance, to be 0, thereby generating the ending score map 540. Referring to the first row of the ending score map 540, when the first snippet $S_1$ is set as a reference snippet, the score calculation module 252 may determine an ending score of the first snippet $S_1$, which includes no action instance, to be 0 (none). Referring to the second row of the ending score map 540, when the second snippet $S_2$ is set as a reference snippet, the score calculation module 252 may determine an ending score of a location of a snippet adjacent to the right of the second snippet $S_2$ (the third snippet $S_3$), which corresponds to the ending point of the first action instance, to be 1. Referring to the third row of the starting score map 530, when the third snippet $S_3$ is set as a reference snippet, the score calculation module 252 may determine the ending score of the third snippet $S_3$, which corresponds to the ending point of the first action instance, to be 1. In this way, the score calculation module 252 may generate the ending score map 540 including the ending scores of all the snippets included in the snippet sequence 510.

According to an embodiment, the score calculation module 252 may generate a score calculation model by performing supervised learning on the feature information of the snippet sequence 510, the relatedness score map 520, the starting score map 530, and the ending score map 540. According to various embodiments, the score calculation module 252 may generate a score calculation model by performing supervised learning not on a two-dimensional (2D) score map as shown in FIG. 5B but on a one-dimensional (1D) score sequence 510 in a sliding window manner. According to various embodiments, the score calculation module 252 may generate at least one of a starting score, an ending score, and a relatedness score even for a proposal generation target depending on a method corresponding to a learning process.

In FIGS. 5A and 5B, an example in which the score calculation module 252 checks three left snippets and three right snippets as neighboring snippets has been described. However, the present invention is not limited thereto. For example, the score calculation module 252 may adjust the number of neighboring snippets according to at least one variable of the number of snippet sequences, the proportion (or number) of action instances included in the snippet sequence, and an action duration of an action instance. For example, the score calculation module 252 may increase the number of neighboring snippets as the proportion of the action instances increases or the action duration of the action instances increases.

Figure 6:
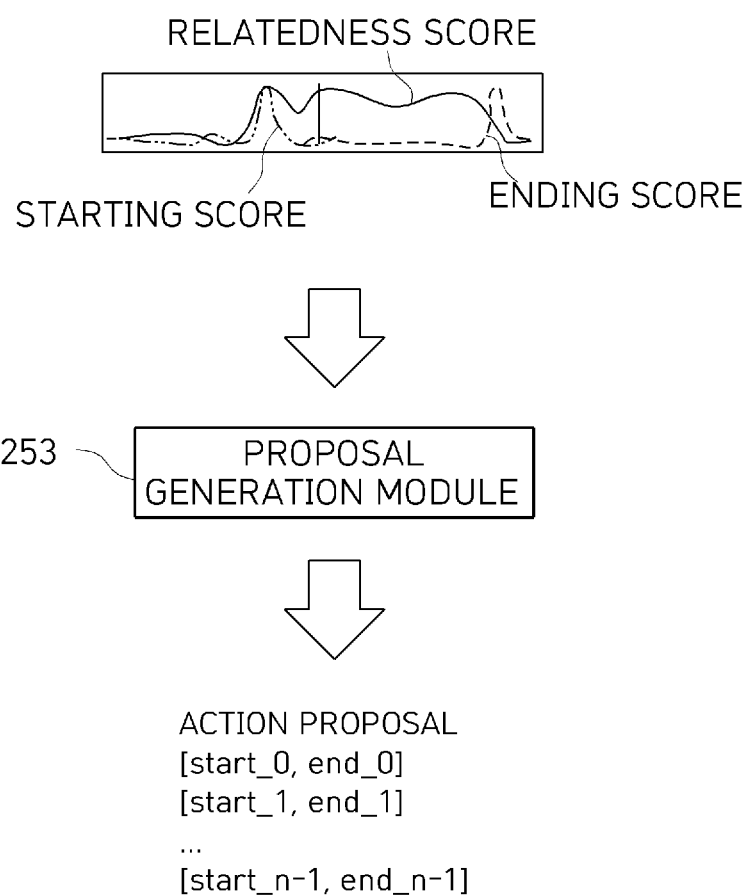
FIG. 6 shows a configuration of a proposal generation module according to an embodiment.

FIG. 6 shows a configuration of a proposal generation module according to an embodiment.

Referring to FIG. 6, the proposal generation module 253 according to an embodiment may generate action proposals corresponding to all action instances included in a video by setting a period from a starting point of each action instance to an ending point thereof as one time section on the basis of a starting score, an ending score, and a relatedness score of each snippet. For example, the proposal generation module 253 may generate a time section of a specified type including at least one of a first time section corresponding to a combination of snippets in which a sum of the starting score and the ending score is maximized in the entire video, a second time section corresponding to a combination of snippets in which relatedness scores of action instances are greater than or equal to a threshold value, or a third time section corresponding to a weighted sum of the first time section and the second time section. As another example, the proposal generation module 253 may generate all action proposals included in the entire video by cutting each of the generated time sections out of the entire video to generate one action proposal.

Figure 7:
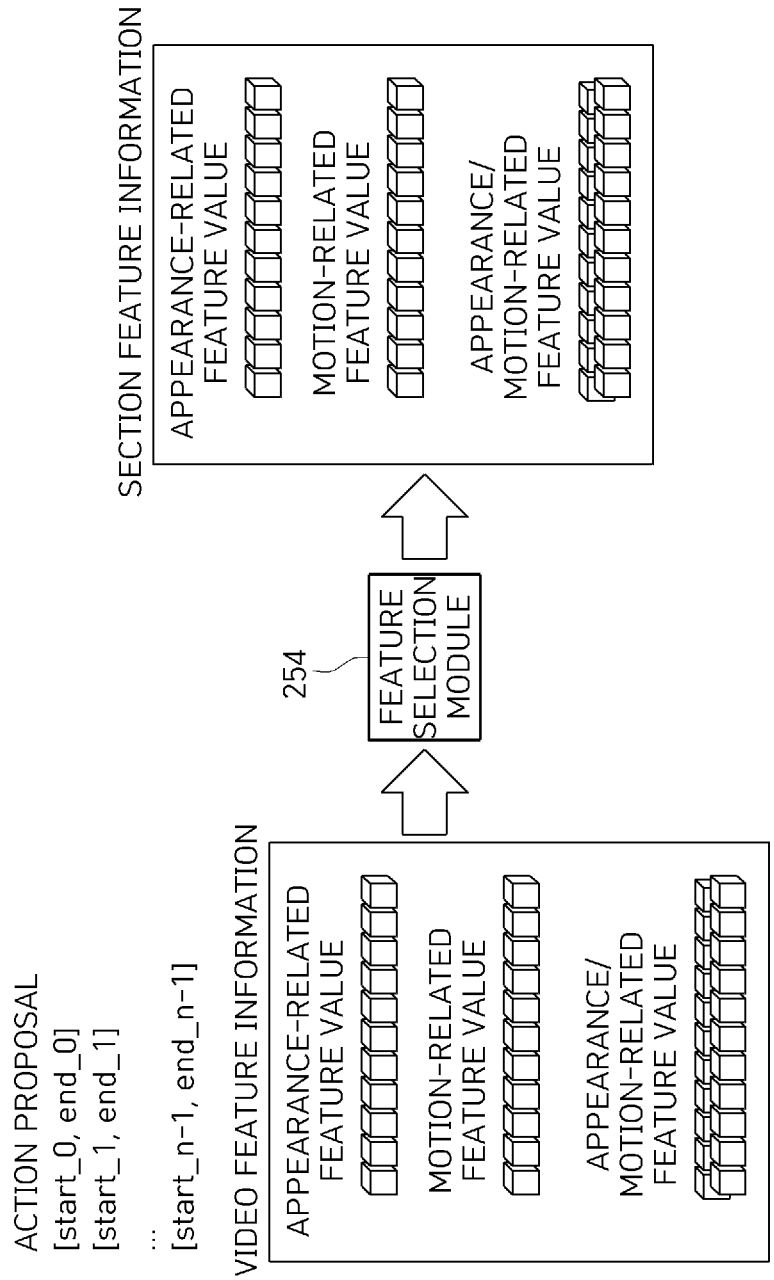
FIG. 7 shows a configuration of a feature selection module according to an embodiment.

FIG. 7 shows a configuration of a feature selection module according to an embodiment.

Referring to FIG. 7, the feature selection module 254 according to an embodiment may select section feature information corresponding to each action proposal from the snippet-based feature information for the entire video and associate the selected section feature information to each action proposal. The generated at least one action proposal and the selected section feature information may be input to the action recognition module 257. In this case, the action recognition module 257 may classify a class to which each action proposal belongs on the basis of the section feature information and output information regarding the classified class.

Figure 8:
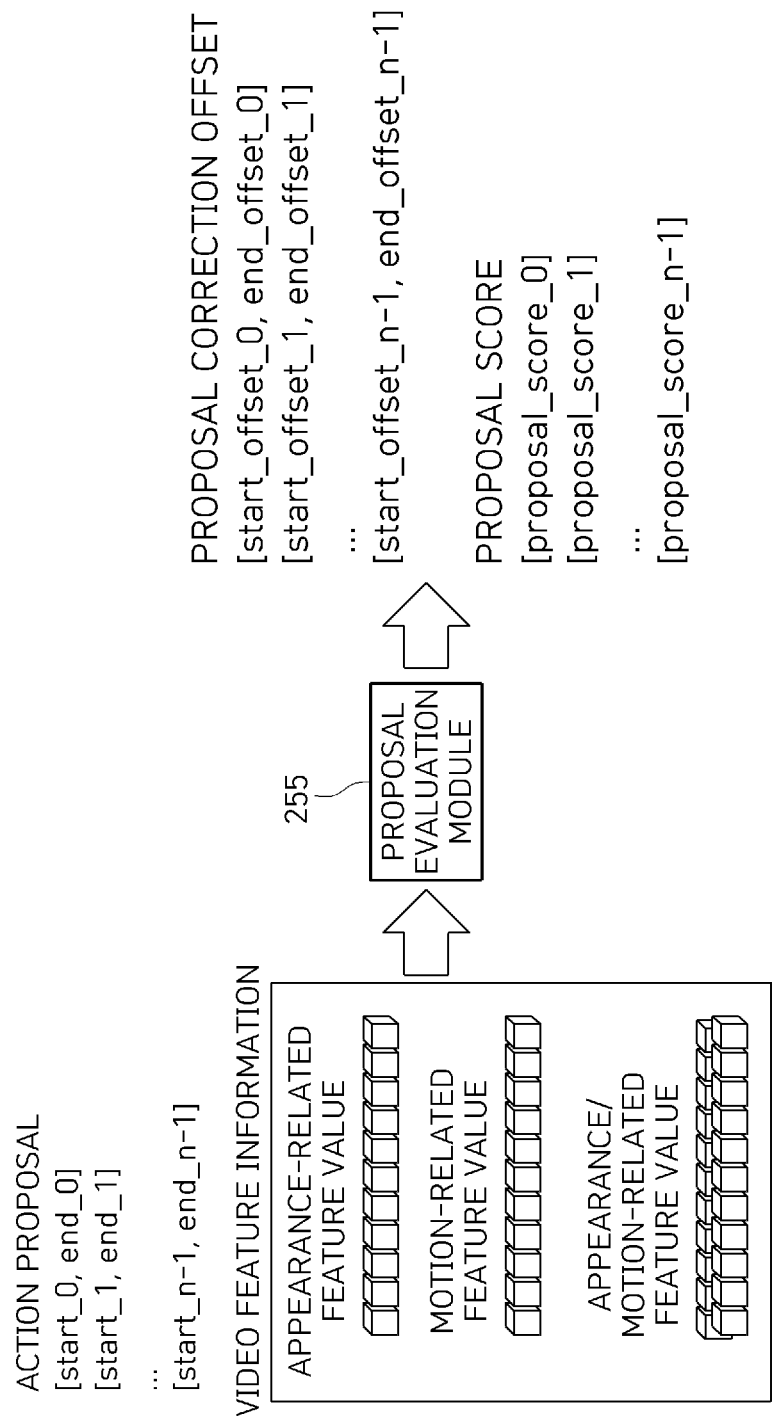
FIG. 8 shows a configuration of a proposal evaluation module according to an embodiment.

FIG. 8 shows a configuration of a proposal evaluation module according to an embodiment.

Referring to FIG. 8, the proposal evaluation module 255 according to an embodiment may acquire action proposals and section feature information related to the action proposals, input section information and the section feature information of the acquired action proposals to an evaluation model, and determine a proposal score and a proposal correction offset of each action proposal. For example, the proposal evaluation module 255 may determine a time section including an action instance included in each action proposal on the basis of the section feature information (e.g., motion-related feature value) and may determine a higher proposal score when the determined time section is more similar to the section information of each action proposal. The proposal evaluation module 255 may determine the proposal correction offset so that a difference between the checked time section and section information of each action proposal can be reduced. As another example, the proposal evaluation module 255 may determine the proposal correction offset for an action proposal with a proposal score being greater than or equal to a specified threshold value. In this regard, the proposal evaluation module 255 may generate an evaluation module capable of determining a proposal score and a proposal correction offset by performing supervised learning on an action proposal corresponding to a training snippet sequence (e.g., 510 in FIG. 5A) and section feature information of the action proposal and may determine the proposal correction offset and the proposal score on the basis of an evaluation model by inputting the acquired section feature information and section information of the action proposal to be evaluated to the generated evaluation model.

Figure 9:
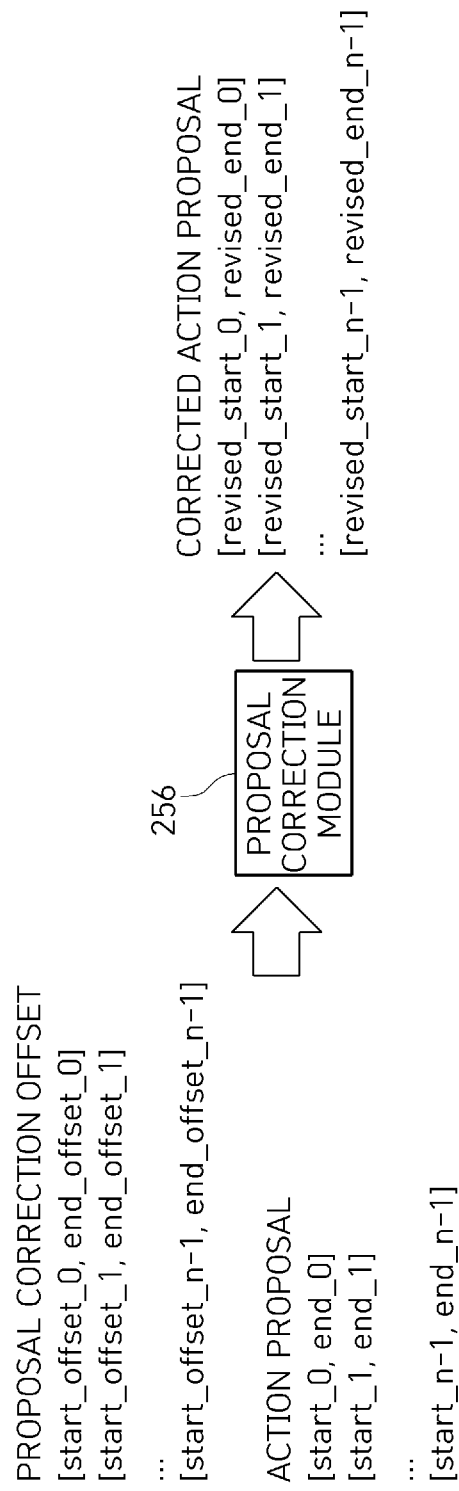
FIG. 9 shows a configuration of a proposal correction module according to an embodiment.

FIG. 9 shows a configuration of a proposal correction module according to an embodiment.

Referring to FIG. 9, the proposal correction module 256 according to an embodiment may correct a time section of an action proposal on the basis of a proposal correction offset. For example, the proposal correction module 256 may adjust at least one of a time section, a starting time, or an ending time of an action proposal according to the proposal correction offset.

Figure 10:
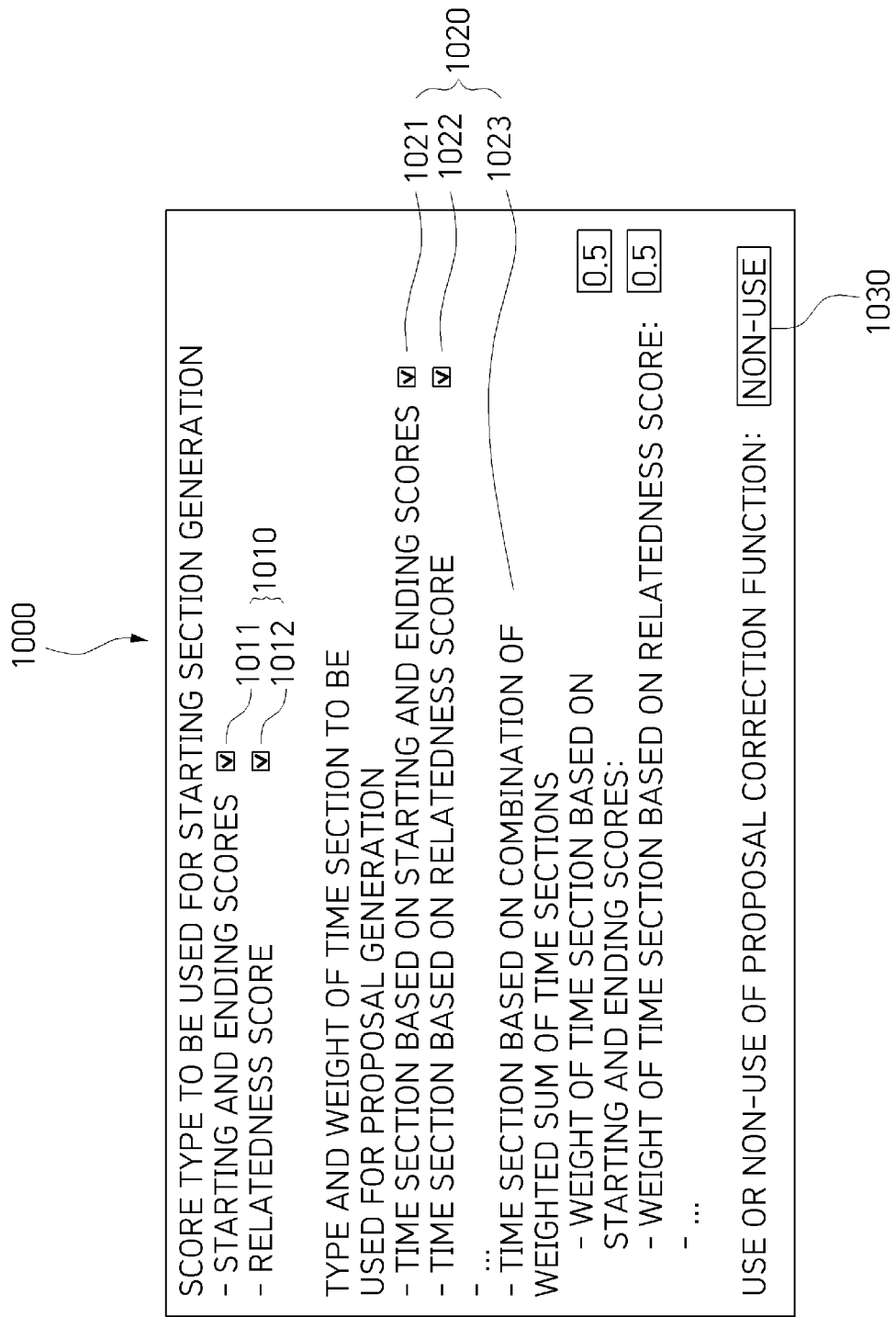
FIG. 10 shows a user interface (UI) screen related to variable settings for action proposal generation according to an embodiment.

FIG. 10 shows a user interface (UI) screen related to variable settings for action proposal generation according to an embodiment.

Referring to FIG. 10, according to an embodiment, an electronic device 100 may provide a UI screen 1000 related to variable settings for action proposal generation through an output circuit 220. As a response to the UI screen 1000, the electronic device 100 may, through an input circuit 210, acquire a user input for setting at least one variable among a score type to be calculated to generate a time section (1010), a type and weight of a time section to be used for proposal generation (1020), and the use or non-use of proposal correction (1030). When the user input is acquired, the electronic device 100 may check a setting of at least one variable and generate an action proposal corresponding to the set variable.

According to an embodiment, the electronic device 100 may generate a time section corresponding to the score type 1010 checked from the user input in the entire video. For example, when a starting score and an ending score are selected for the score type 1010, the electronic device 100 may generate at least one first time section by combining snippets in which a sum of the starting score and the ending score is maximized in the entire video. As another example, when a relatedness score is selected for the score type 1010, the electronic device 100 may generate at least one second time section by combining snippets in which relatedness scores of action instances in the entire video are greater than or equal to a threshold value.

As another example, the electronic device 100 may generate an action proposal corresponding to the type and weight of the time section to be used for proposal generation (hereinafter referred to as a type and weight of the time section 1020) checked from the user input using the entire video. For example, when the type and weight of the time section 1020 is selected as the first time section (e.g., the section of 1021), the electronic device 100 may generate an action proposal by cutting the first time section out of the entire video. As another example, when the type and weight of the time section 1020 is selected as the second time section (e.g., the section of 1023), the electronic device 100 may generate an action proposal by cutting the second time section out of the entire video. As still another example, when the type and weight of the time section 1020 is selected as the weighted sum 1023 of time sections, the electronic device 100 may generate a third time section by weighted-summing the first time section and the second time section according to a set weight value (e.g., 0.5) and generate an action proposal by cutting the third time section out of the entire video.

Figure 11:
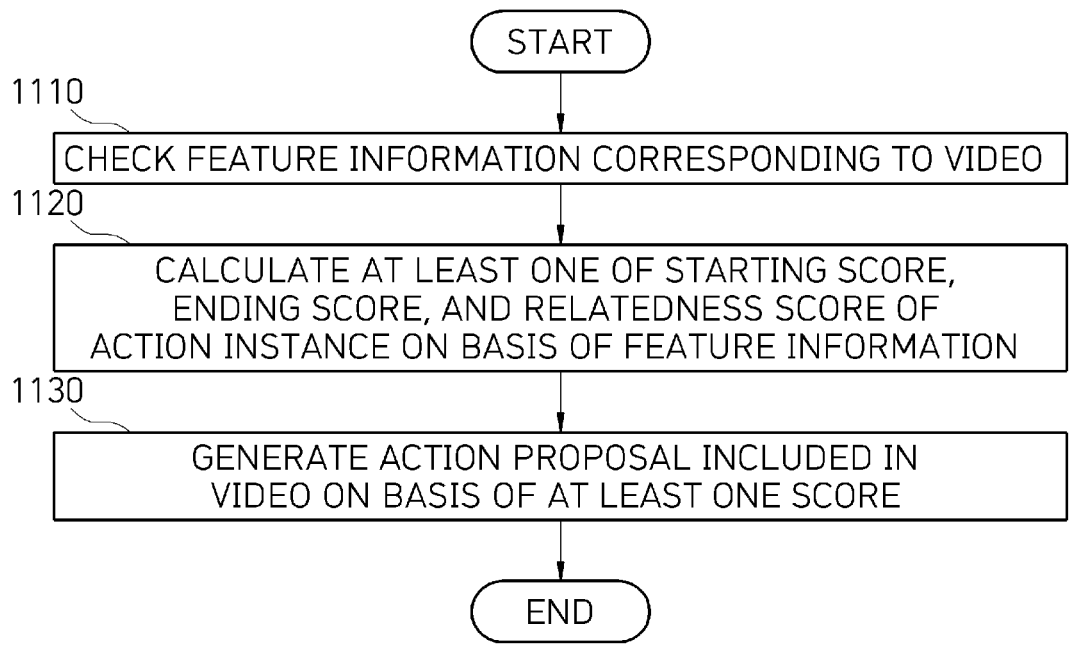
FIG. 11 shows a flowchart of an action proposal generation method according to an embodiment.

FIG. 11 shows a flowchart of an action proposal generation method according to an embodiment.

Referring to FIG. 11, in operation 1110, an electronic device 100 may check feature information corresponding to a video and including at least one of an appearance-related feature value and a motion-related feature value.

In operation 1120, the electronic device 100 may calculate at least one of a starting score related to a starting point of an action instance, an ending score related to an ending point of an action instance, and a relatedness score between action instances on the basis of feature information corresponding to the video, the action instances being included in the video.

In operation 1130, the electronic device 100 may generate an action proposal included in the video on the basis of at least one score.

According to various embodiments disclosed herein, it is possible to generate an action instance (or case) on the basis of an occurrence time (e.g., a starting point and an ending point) of the action instance. In addition, it is possible to provide various advantageous effects that are directly or indirectly obtained through this document.

The various embodiments and the terms used herein are not intended to limit the technical features disclosed herein to specific embodiments and should be understood to include various modifications, equivalents, or alternatives of the corresponding embodiments. In describing the drawings, similar reference numerals may be used to designate similar or relevant constituent elements. The singular form of a noun corresponding to an item may include one or more items, unless the context clearly indicates otherwise. Herein, phrases such as "A or B," "at least one of A and B," "at least one of A or B," "A, B, or C," "at least one of A, B, and C," and "at least one of A, B, or C" may include any one or all possible combinations of items listed in the phrases. Terms such as "first" and "second" may simply be used to distinguish corresponding elements from the other elements, and the corresponding elements are not limited in other respects (e.g., importance or order). When a certain (e.g., first) element is referred to as being "coupled" or "connected" to another (e.g., second) element, with or without a term "functionally" or "communicatively," it means that the certain element can be connected to the other element directly (e.g., by wire), wirelessly, or via a third element.

The term "module" used herein may include a unit implemented in hardware, software, or firmware and may be used interchangeably with, for example, terms such as logic, logic block, component, or circuit. The "module" may be an integrated component, a minimum unit for performing one or more functions, or a part thereof. For example, according to an embodiment, the "module" may be implemented in the form of an application-specific integrated circuit (ASIC).

Various embodiments disclosed herein may be implemented by software (e.g., a program) including one or more instructions stored in a storage medium (e.g., an internal memory or an external memory; the memory 240) readable by a machine (e.g., the electronic device 100). For example, a processor (e.g., the processor 250) of the machine (e.g., the electronic device 100) may call and execute at least one of the one or more instructions stored in the storage medium. This enables the machine to be operated to perform at least one function in accordance with the at least one called instruction. The one or more instructions may include code generated by a compiler or code executable by an interpreter. The machine-readable storage medium may be provided in the form of a non-transitory storage medium. Here, the term "non-transitory" merely denotes that the storage medium is tangible and does not include a signal (e.g., electromagnetic waves), irrespective of whether data is semi-permanently or temporarily stored in the storage medium.

According to an embodiment, the method according to various embodiments disclosed herein may be included and provided in a computer program product. The computer program product may be traded between a seller and a purchaser as a commodity. The computer program product may be distributed in the form of a machine-readable storage medium (e.g., compact disc read-only memory (CD-ROM)), or may be distributed (e.g., downloaded or uploaded) via an application store (e.g., PlayStore™), directly between two user devices (e.g., smartphones), or online. For online distribution, at least a portion of the computer program product may be at least provisionally generated or temporarily stored in a machine-readable storage medium such as a memory of a manufacturer's server, an application store's server, or a relay server.

According to various embodiments, each of the above-described elements (e.g., modules or programs) may include one or more entities. According to various embodiments, one or more of the above-described elements or operations may be omitted, or one or more other elements or operations may be added. Alternatively or additionally, a plurality of elements (e.g., modules or programs) may be integrated into one element. In such a case, the integrated element may perform one or more functions of each of the plurality of elements in the same or similar manner as being performed by the corresponding one among the plurality of elements prior to the integration. According to various embodiments, operations performed by a module, a program, or other elements may be executed sequentially, in parallel, repeatedly, or heuristically. One or more of the operations may be omitted or executed in different orders. Alternatively, one or more other operations may be added.

What is claimed is:

1. An electronic device comprising:
a memory including at least one instruction; and
a processor,
wherein by executing the at least one instruction, the processor is configured to:
check feature information corresponding to a video and including at least one of an appearance-related feature value and a motion-related feature value from the video;
calculate a starting score related to a starting point of an action instance, an ending score related to an ending point of an action instance, and a relatedness score between action instances on the basis of the feature information corresponding to the video, the action instances being included in the video; and
generate an action proposal included in the video on each of the calculated score.

2. The electronic device of claim 1, wherein by executing the at least one instruction, the processor is configured to:
group a plurality of frames constituting the video on a specified frame basis to generate a plurality of snippets; and
check the at least one feature value corresponding to each of the plurality of snippets.

3. The electronic device of claim 1, wherein by executing the at least one instruction, the processor is configured to:
sample at least some of the plurality of frames constituting the video;
generate an RGB frame and a FLOW frame using the sampled frames; and
perform at least one of an operation of determining the appearance-related feature value from the RGB frame and an operation of determining the motion-related feature value from the FLOW frame.

4. The electronic device of claim 1, wherein by executing the at least one instruction, the processor sets a relatedness score, which is of a location of one of a snippet, a preceding snippet, and a following snippet in which a probability of including an action instance is greater than or equal to a first threshold probability, to be relatively high on the basis of the feature information corresponding to the video.

5. The electronic device of claim 1, wherein by executing the at least one instruction, the processor is configured to set a starting score, which is of a location of one of a snippet and a preceding snippet in which a probability of being a starting point of an action instance is greater than or equal to a second threshold probability on the basis of the feature information corresponding to the video.

6. The electronic device of claim 1, wherein by executing the at least one instruction, the processor is configured to set an ending score, which is of a location of one of a snippet and a following snippet in which a probability of being an ending point of an action instance is greater than or equal to a third threshold probability on the basis of the feature information corresponding to the video.

7. The electronic device of claim 1, wherein by executing the at least one instruction, the processor is configured to:
determine at least one time section including a starting point and an ending point of each action instance on the basis of the at least one score; and
cut the at least one time section out of the video to generate an action proposal included in the video.

8. The electronic device of claim 7, wherein the at least one time section may include at least one of a first time section corresponding to a combination of snippets in which a sum of the starting score and the ending score is relatively high, a second time section corresponding to a combination of snippets in which the relatedness score is greater than or equal to a threshold value, and a third time section corresponding to a weighted sum of the first time section and the second time section.

9. The electronic device of claim 7, wherein by executing the at least one instruction, the processor is configured to:
select feature information corresponding to the at least one time section from the feature information corresponding to the video;
determine a correction offset of the action proposal on the basis of the selected feature information; and
correct the action proposal on the basis of the determined correction offset.

10. The electronic device of claim 9, wherein by executing the at least one instruction, the processor is configured to:
determine a proposal score corresponding to reliability of the action proposal on the basis of the selected feature information; and determine the correction offset for an action proposal in which the proposal score is greater than or equal to a specified score.

11. The electronic device of claim 7, wherein by executing the at least one instruction, the processor is configured to:
expand the at least one time section to include at least a portion of a specified preceding time section or a specified following time section; and
select feature information corresponding to the expanded time section.

12. A method of an electronic device generating an action proposal, the method comprising:
checking feature information corresponding to a video and including at least one of an appearance-related feature value and a motion-related feature value from the video;
calculating a starting score related to a starting point of an action instance, an ending score related to an ending point of an action instance, and a relatedness score between action instances on the basis of the feature information corresponding to the video, the action instances being included in the video; and
generating an action proposal included in the video on each of the calculated score.

13. The method of claim 12, wherein the checking comprises:
grouping a plurality of frames constituting the video on a specified frame basis to generate a plurality of snippets; and
checking the at least one feature value corresponding to each of the plurality of snippets.

14. The method of claim 12, wherein the calculating comprises setting a relatedness score, which is of a location of one of a snippet, a preceding snippet, and a following snippet in which a probability of including an action instance is greater than or equal to a first threshold probability, to be relatively high on the basis of the feature information corresponding to the video.

15. The method of claim 12, wherein the calculating comprises setting a starting score, which is of a location of one of a snippet and a preceding snippet in which a probability of being a starting point of an action instance is greater than or equal to a second threshold probability, to be relatively high on the basis of the feature information corresponding to the video.

16. The method of claim 12, wherein the calculating comprises setting an ending score, which is of a location of one of a snippet and a following snippet in which a probability of being an ending point of an action instance is greater than or equal to a third threshold probability, to be relatively high on the basis of the feature information corresponding to the video.

17. The method of claim 12, wherein the generating comprises:
determining at least one time section including a starting point and an ending point of each action instance on the basis of the at least one score; and
cutting the at least one time section out of the video to generate at least one action proposal included in the video.

18. The method of claim 17, wherein the at least one time section includes at least one of a first time section corresponding to a combination of snippets in which a sum of the starting score and the ending score is relatively high, a second time section corresponding to a combination of snippets in which the relatedness score is greater than or equal to a threshold value, and a third time section corresponding to a weighted sum of the first time section and the second time section.

19. The method of claim 17, further comprising:
selecting feature information corresponding to the at least one time section from the feature information corresponding to the video;
determining a correction offset of the action proposal on the basis of the selected feature information; and
correcting the action proposal on the basis of the correction offset.

20. A non-transitory computer-readable recording medium storing instructions executable by a processor, wherein when executed, the instructions cause a processor of an electronic device to perform operations of:
checking feature information corresponding to a video and including at least one of an appearance-related feature value and a motion-related feature value from the video;
calculating a starting score related to a starting point of an action instance, an ending score related to an ending point of an action instance, and a relatedness score between action instances on the basis of the feature information corresponding to the video, the action instances being included in the video; and
generating an action proposal included in the video on each of the calculated score.

* * * * *